Feb. 17, 1953 L. C. MAHER 2,628,604
MULTICYLINDER MOTOR
Filed Feb. 18, 1946 9 Sheets-Sheet 1
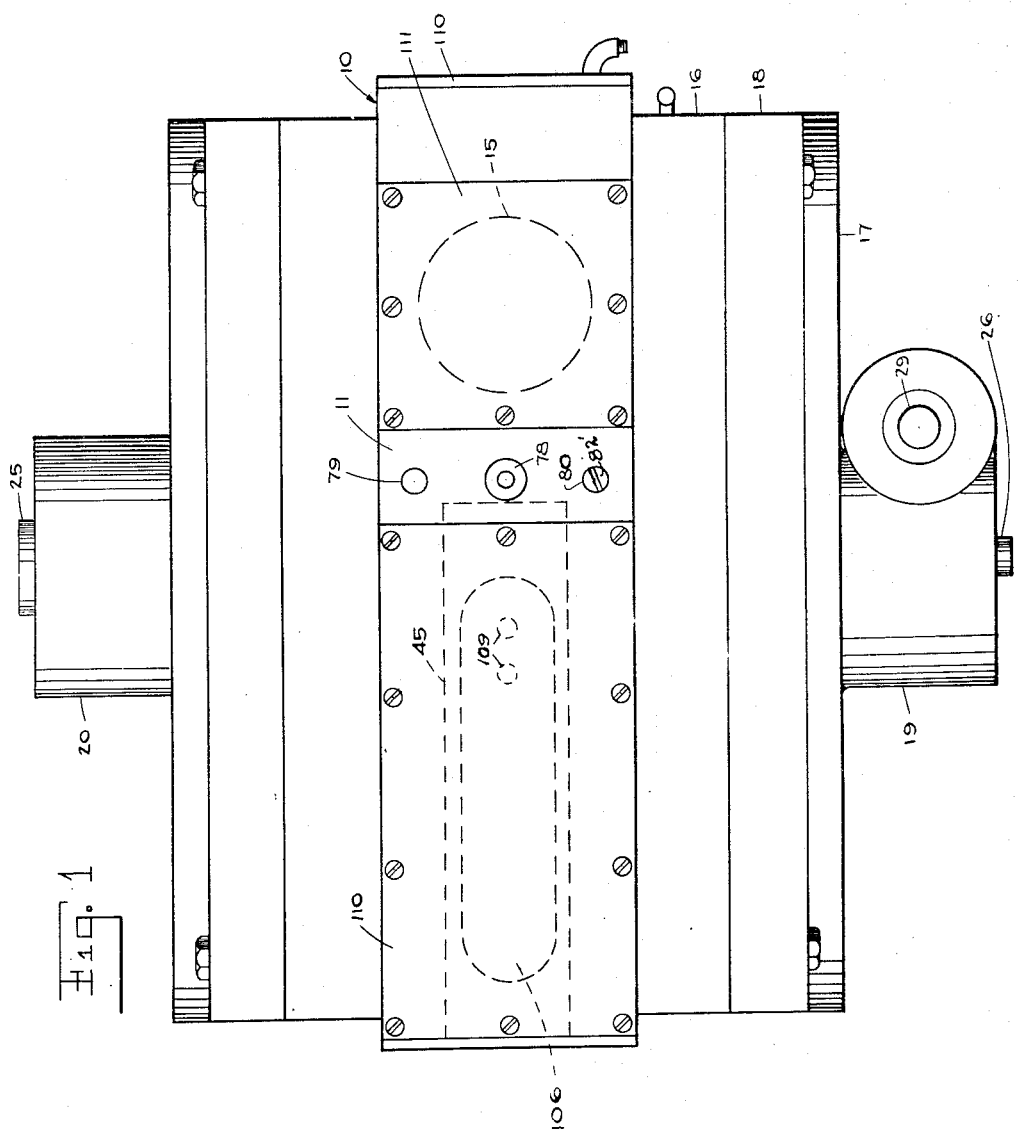
INVENTOR.
LAURENCE C. MAHER
BY
H. M. Kilpatrick Feb. 17, 1953     L. C. MAHER     2,628,604
MULTICYLINDER MOTOR
Filed Feb. 18, 1946     9 Sheets-Sheet 2
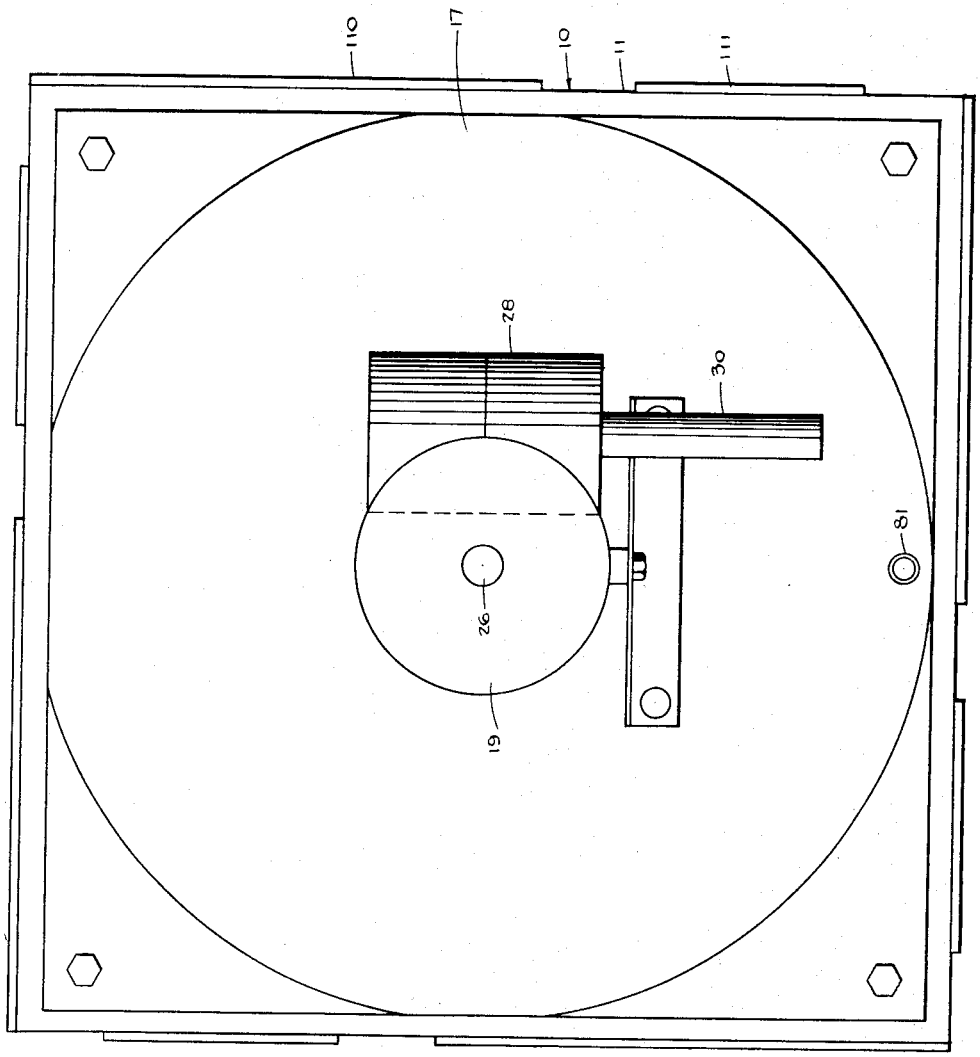
INVENTOR.
LAURENCE C. MAHER
BY
H. M. Kilpatrick

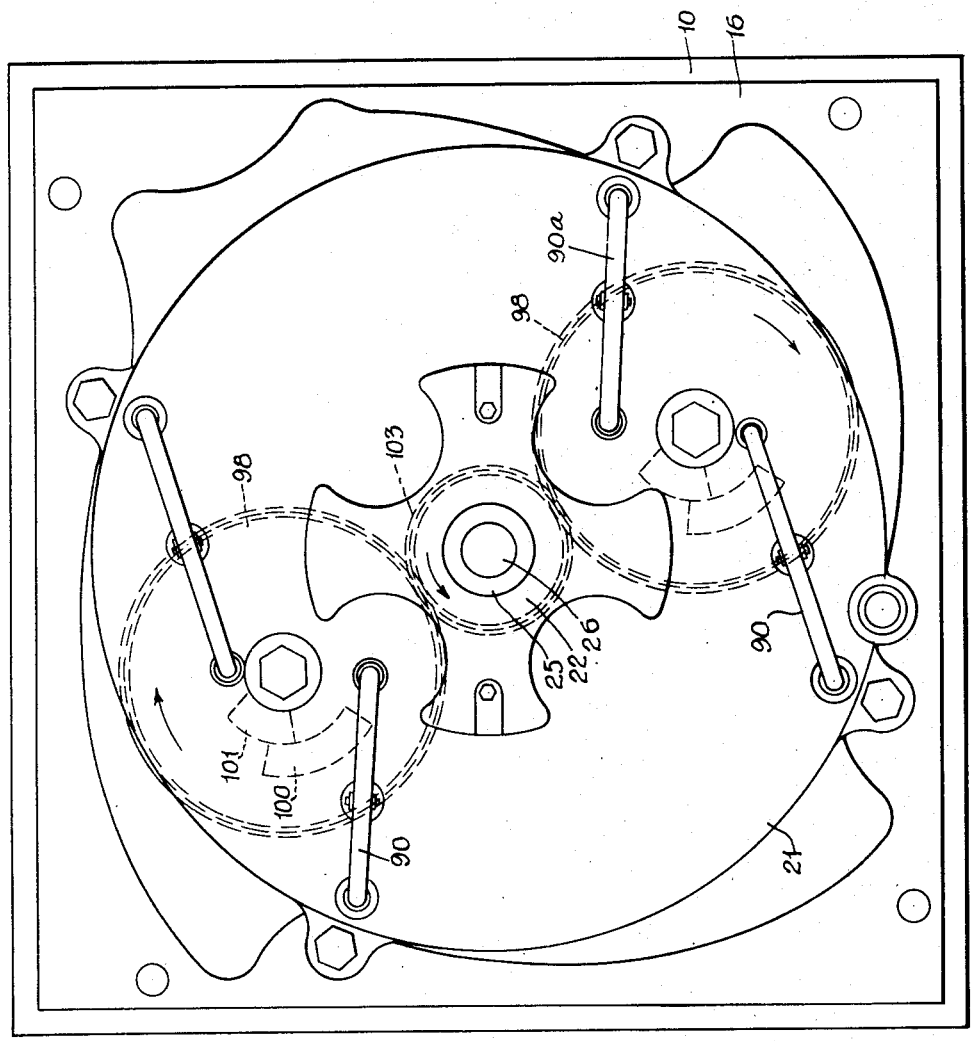

Feb. 17, 1953  L. C. MAHER  2,628,604
MULTICYLINDER MOTOR
Filed Feb. 18, 1946  9 Sheets-Sheet 4
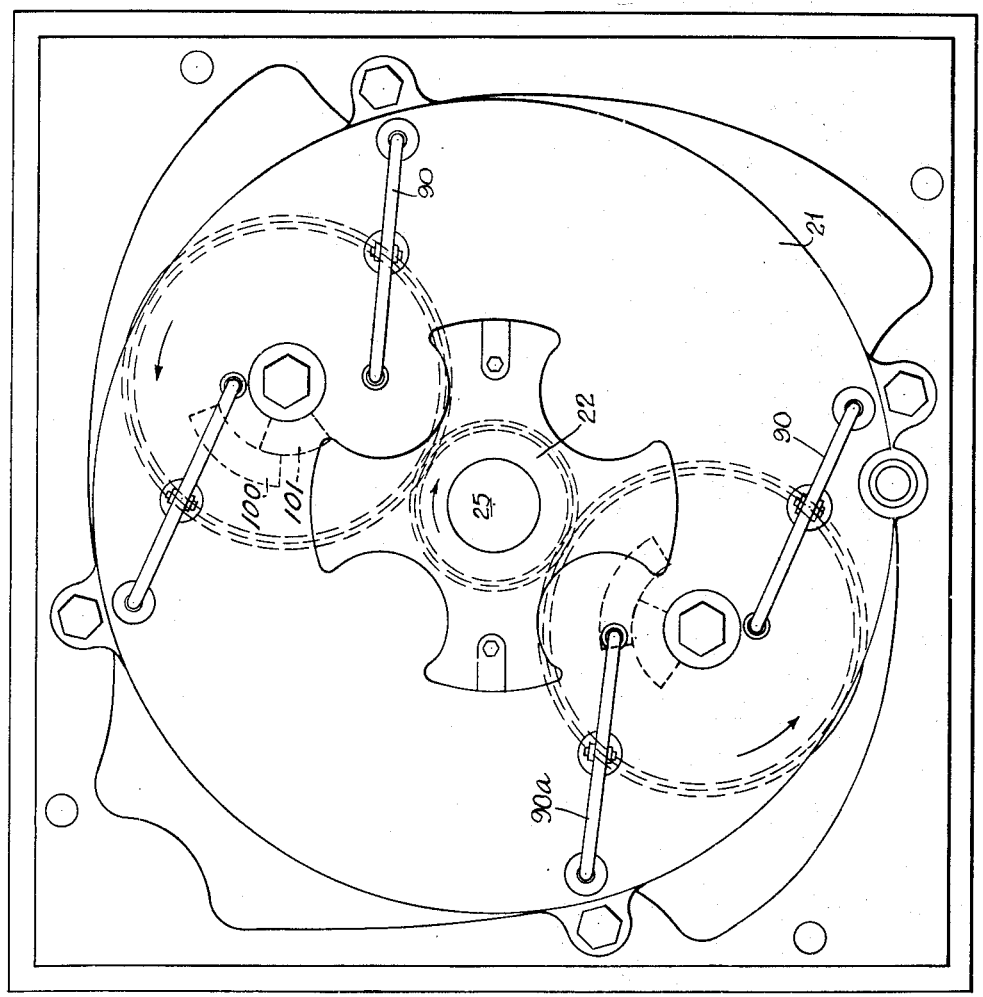
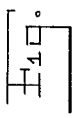
INVENTOR.
LAURENCE C. MAHER
BY

INVENTOR.
LAURENCE C. MAHER

Feb. 17, 1953 L. C. MAHER 2,628,604
MULTICYLINDER MOTOR
Filed Feb. 18, 1946 9 Sheets-Sheet 6

INVENTOR.
LAURENCE C. MAHER
BY

Feb. 17, 1953   L. C. MAHER   2,628,604
MULTICYLINDER MOTOR
Filed Feb. 18, 1946   9 Sheets-Sheet 7
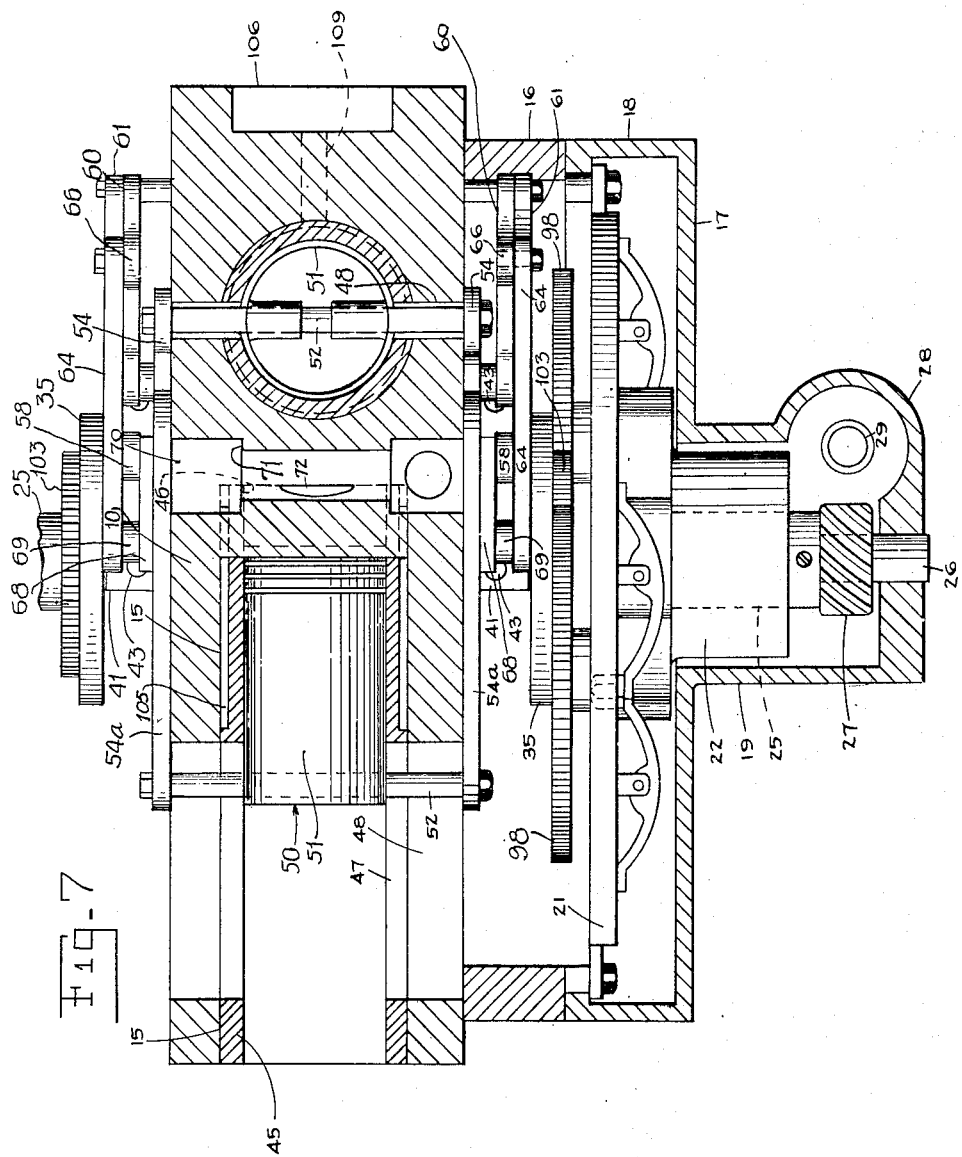
INVENTOR.
LAURENCE C. MAHER
BY
H. M. Kilpatrick Feb. 17, 1953
L. C. MAHER
2,628,604
MULTICYLINDER MOTOR
Filed Feb. 18, 1946
9 Sheets-Sheet 8
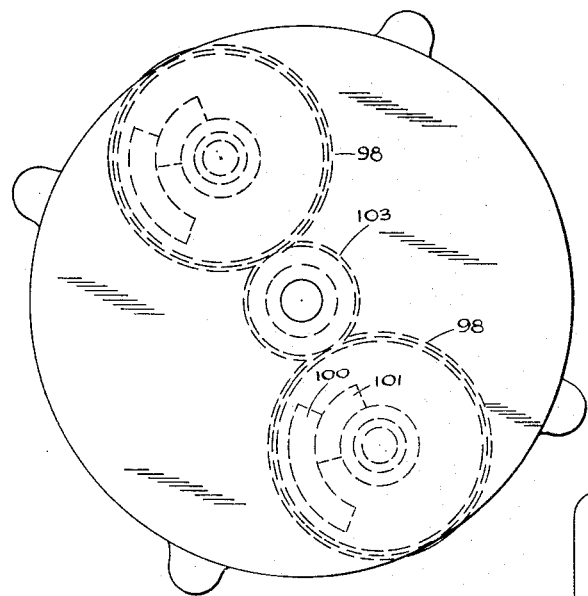
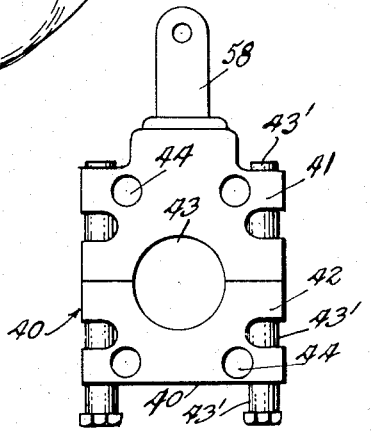
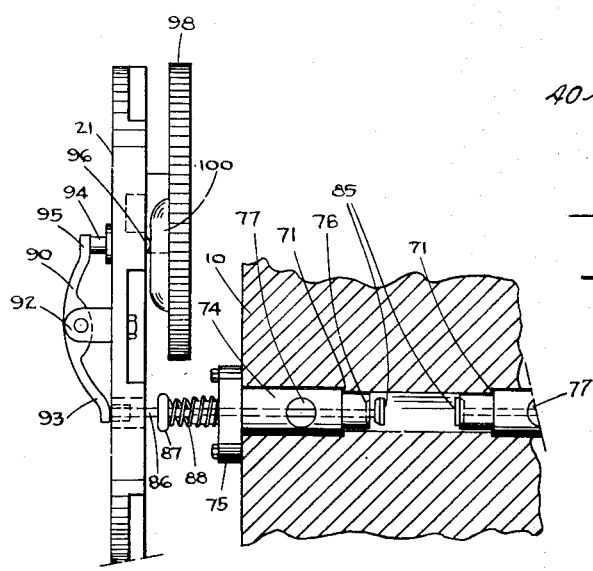
INVENTOR.
LAURENCE C. MAHER
BY
H. M. Kilpatrick Feb. 17, 1953           L. C. MAHER           2,628,604

MULTICYLINDER MOTOR

Filed Feb. 18, 1946           9 Sheets-Sheet 9

INVENTOR
LAURENCE C. MAHER
BY
ATTORNEY

Patented Feb. 17, 1953

2,628,604

UNITED STATES PATENT OFFICE 2,628,604

MULTICYLINDER MOTOR

Laurence C. Maher, Asbury Park, N. J.

Application February 18, 1946, Serial No. 648,465

23 Claims. (Cl. 123—54)

This invention relates to motors, and, to internal combustion and multi-cylinder motors and more particularly to four-cylinder internal combustion engines, though it is noted that in some of the claims the invention is not limited to the number of cylinders or to multi-cylinder motors nor even to internal combustion motors.

Objects of the invention are to provide an improved arrangement of engine cylinder and crank shaft whereby the piston pulls upon the crank shaft instead of pushing it and the piston travel is greater than the crank shaft throw thus increasing the leverage on the crank shaft and increasing the power;

Other objects are to provide a design which may be changed to change the piston stroke without changing the crank pin throw and to provide an engine unit which may be used with similar units on the same shaft to evenly distribute the power impulses around the shaft.

Other objects are to provide an improved arrangement of cylinders disposable in a compact rectangular block supporting all parts of the engine, and to provide a compact connection between the piston and the crank shaft adaptable for steam, internal combustion and other pressure medium engines.

Additional objects of the invention are to effect simplicity and efficiency in such motors and to provide a simple valve operating means therefor, and to provide a motor which is economical, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with an improved multi-cylinder motor which briefly stated, includes a square engine block having cylinders therein having their axes substantially parallel with the sides of the square, with the outer cylinder ends pointing outwardly. A rotatably mounted crank shaft passes through a central opening in the block and has crank pins at opposite sides of the block. A cross head mounted on each crank pin carries connecting rod bearing pins defining a square with sides respectively substantially parallel to said first named square. A piston in each cylinder has piston pin ends projecting on opposite sides of said plane, to which ends are connected piston connecting rods connected at the other end to the adjacent bearing pin most remote from the associated piston pin; and means are provided for holding the angular direction of the cross-head substantially constant.

Bores in the block receive inlet and exhaust valves communicating with the inner end of each cylinder; and timing cam gears driven from the main shaft are each provided with cam lugs engageable with means connected with the valves for operating the valves.

In the accompanying drawing showing, by way of example, two of many possible embodiments of the invention, Fig. 1 is a plan showing the complete engine;

Fig. 2 is a side elevation;

Fig. 3 is a side elevation showing the inlet valve operating mechanism, parts being removed;

Fig. 4 is a similar view of the exhaust valve operating mechanism showing the cams in positions depicting the same portion of the cycle of operation as is depicted in Fig. 3;

Fig. 7 is a horizontal sectional view, partly in plan, the section being taken substantially on the line 7—7 of Fig. 5;

Fig. 9 is a side elevation showing the cross-head;

Fig. 10 is a side elevation showing the relation between the valve operating cam gears;

Fig. 11 is a fragmental plan, partly in section, showing a valve and its operating mechanism;

Figure 5:
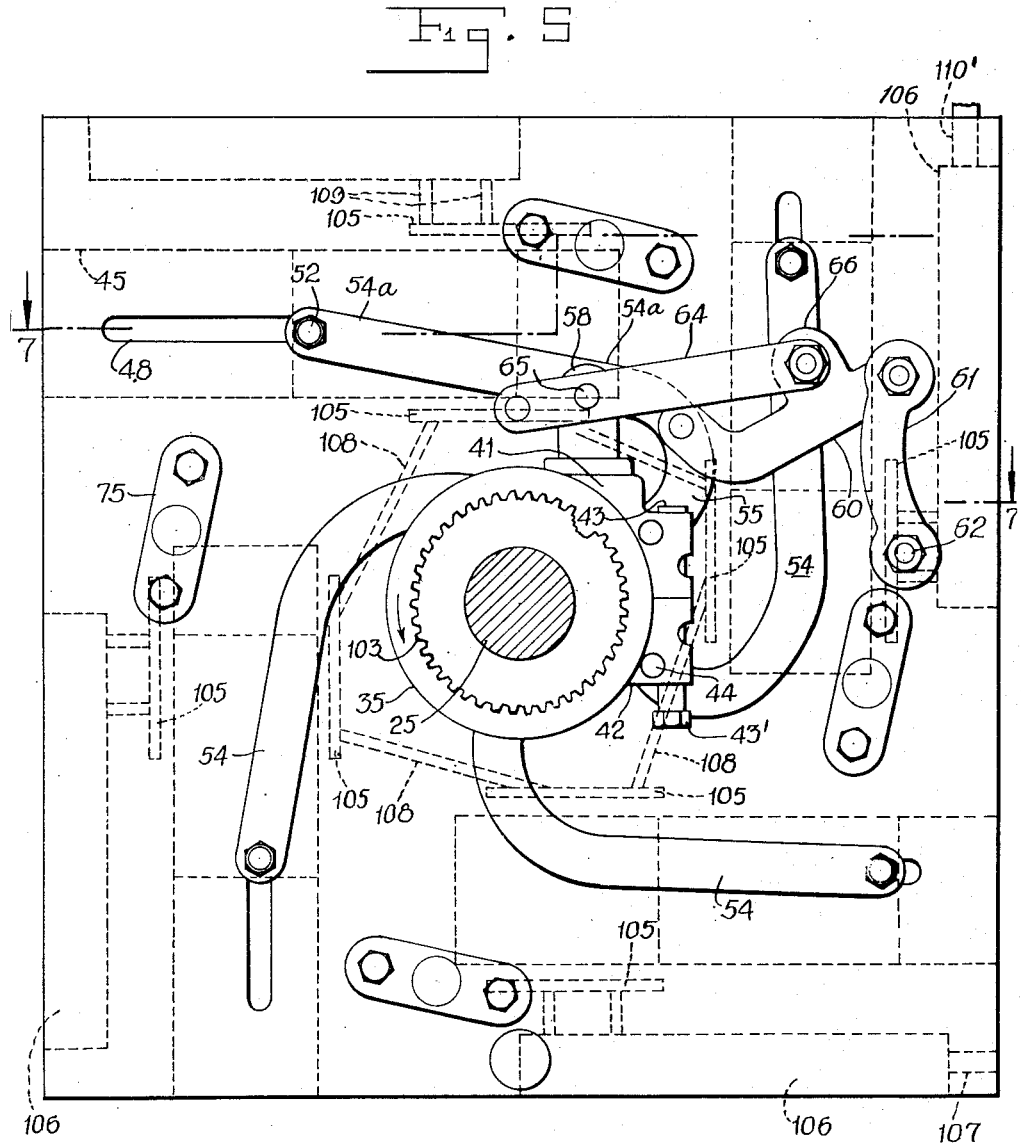
Fig. 5 is a side elevation, parts being removed, showing the cross-head controlling mechanism in one position.

The body structure of my improved engine includes a rectangular metallic engine block 10 having relatively narrow edge faces 11 and wide substantially square side faces 12 (Fig. 6) and provided with a large central opening or bore 14 passing through the side faces. Cylinder-receiving bores 15 (Fig. 7) are provided passing substantially perpendicularly through said edge faces 11 near corresponding ends thereof, each cylinder extending to near the corresponding cylinder receiving bore 15 of an adjacent edge face.

Housings are secured to said large side faces respectively, each housing comprising thick inner walls 16 bolted to the edges of said side faces, and a side wall 17 parallel to and spaced from the adjacent side face and formed with lateral walls 18 secured to said inner walls. Said side walls 17 are provided with large central bosses 19, 20 alined with the central bore of the block; and a supporting disk 21 (Figs. 3 and 7) mounted fast on each inner wall and spaced from the side wall and block is provided with a tubular bearing 22 fast on the disk and received in the adjacent central boss 19 or 20.

A crank shaft 25 rotatably received in said bearings 22 and disposed coaxial in said central bore 14 is provided at one end with a reduced diameter extension 26 carrying a spiral gear 27 housed in a gear housing 28 fast on the adjacent side wall provided with bearings 29 adapted to support a worm shaft 30 (Fig. 2) and a worm gear (not shown) to mesh with the spiral gear to drive a sparking timer (not shown) and a lubricating pump operated by such worm shaft (not shown).

Figure 11A:
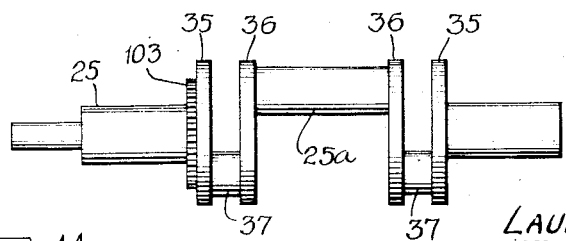
Fig. 11a is a plan of the crank shaft drawn on a smaller scale.

Said crank shaft 25 is provided in the respective housings with pairs of spaced outer and inner eccentric crank disks 35 and 36 (Figs. 5 and 7) constituting cranks, and alined eccentric crank pins 37 between the disks of each pair, and with a diametrically opposite counterbalancing shaft portion 25a (Fig. 11a) in the bore 14 of the block between the inner crank disks 36, for counterbalancing the crank pins, each inner crank disk 36 snugly closing said large opening 14 of the block.

A substantially rectangular cross-head or master connecting rod 40 mounted on each crank pin comprises upper and lower elongated members 41, 42 provided with semi-cylindrical bearing faces 43 cooperating to form a bearing receiving the crank pins 37. Vertical end bolts 43' connect the members and hold them together. Link-receiving or connecting rod bearing pins 44 are mounted in the respective corners of said cross-head parallel to the crank shaft and disposed substantially equal distances from the crank pin and spaced substantially equal angles therearound.

A cylinder 45 (Figs. 5 and 7) fitted in each of said bores 15 has its head 46 at the inner end of the bore and is open at the outer end, the cylinder 45 and the block 10 being provided near said open end with registering longitudinal piston-pin guide-slots 47, 48 in a plane of the cylinder axis perpendicular to the main plane of the block. A piston 50 in each cylinder has an outwardly extending skirt 51 carrying piston pins 52 guided in, and projecting at both ends from, the slots 47, 48.

A piston connecting rod or link 54, 55 or 54a, 55 (Fig. 5) pivotally received on each projecting end of each piston pin, has an elongated part 54 or 54a extending toward the inner end of the cylinder substantially longitudinal to the cylinder and substantially tangential to a circle spaced around the crank pin, each link having an inner end-hook 55 turned toward the cross-head and pivoted at its end to the adjacent connecting rod bearing pin 44 about 90 crank shaft degrees from the associated piston pin 52.

The mid-part of the upper part of the upper member 42 of the master connecting rod or cross-head has a substantially upright holding lever 58 disposed near the longitudinal part 54a of the adjacent piston connecting rod and adapted to cooperate with means about to be described for substantially holding the cross-head, against absolute oscillation as the crank pin revolves, with the edges of the cross-head remaining substantially parallel with respective adjacent cylinders.

A connecting link 60 is pivoted near the juncture of the hooked part 55 and the elongated part 54a of the adjacent piston link nearest the holding lever and extends away from said part in a direction substantially away from the associated piston pin 52 to near the opposite edge of the block and is there pivotally connected to the upper end of a guide lever 61 having its lower end fulcrumed on a fulcrum 62 substantially at the mid-part of the adjacent margin of the block, whereby the distance and direction of movement of the free end of the guide lever 61 approximates that of the associated piston pin 52 and the distance of the movement-component of the crank pin 37 in said direction.

A control link 64 is pivotally connected by a pivot pin 65 at one end to the free end of the holding lever 58 and at the other end to a lug 66 on said connecting link 60 near the free end of the guide lever 61, the pivot point being somewhat offset (in a direction away from said fulcrum 62) from a line connecting the end pivotal connecting points of said connecting link 60, whereby the component of movement of said holding lever in the direction of the piston movement approximates the distance of crank pin movement in said direction and maintains the angle of the master connecting rod or cross-head relative to the block substantially constant, thereby causing all the pins to travel in a path approximately that of the crank.

A short block 68 mounted fast on a spacer piece 69 (Fig. 7) fast on the inner end of the link 64 forms with the link a recess in which the upper end of the holding lever 58 is pivoted by the pivot pin 65.

Various of the links and the levers and the disk 21 may be perforated with large openings for lightness, if desired, but these are omitted from the drawing to avoid confusion.

A valve bore 70 (Fig. 7) passing substantially perpendicularly through the engine block 10 tangential to the outer peripheral part of the inner end of each cylinder, provides a firing chamber at its mid-part and has near each end an outwardly facing shoulder 71 and is provided between said shoulders with an elongated port 72 longitudinal to the bore and communicating with the inner end of the adjacent cylinder 45. A tubular valve housing 74, Fig. 11, is fitted in each end of each bore against said shoulder 71 and has an outer end wall 75 mounted on the block, a valve seat 76 around the inner end and an intermediate lateral port 77. Said engine valve block is bored to provide spark-plug sockets 78 (Fig. 1) open to the mid-part of the bore 70 to receive a spark plug (not shown). Exhaust ducts 79 communicating with one of said lateral ports 77 allow the exhaust gases to discharge to the exterior; while the block is provided with bores 80 (Fig. 6) each extending from an outer face 11, through the end of a bore 70 to an annular inlet manifold duct 81 formed by a groove around the central opening 14 and a bushing 82 closing the groove, the manifold duct communicating through inlet ducts 83, 84 with a carburetor (not shown). The outer end of each bore 80, 83 is closed by a plug 82.

Inwardly opening inlet and exhaust valves 85 are fitted in the respective valve housings, each valve having a stem 86 (Fig. 11) projecting through the outer end wall 75 of the housing and through the disk 21 and provided with a collar 87 fast thereon, between which collar and the valve housing a spring 88 is compressed. Rocker arms 90 one for each cylinder are intermediately fulcrumed on the bracket 92 on the outer face of the supporting disk 21 and each has an active end 93 adapted to press against a valve stem 86 for opening the valve. A short operating rod 94 slidable through an opening in the supporting disk at the motive end 95 of each rocker arm is pressed inwardly by such motive end, and has a rounded inner end 96 adjacent respectively to a pair of timing gears 98 (Figs. 3, 4 and 11) rotatably mounted on and spaced from diagonally opposite parts of the inner face of each supporting disk 21 and each provided on its face next to the supporting disk with a pair of cam lugs 100, 101 different distances from the center of and around the gear, and each engageable with one only of said actuating rods 94 as the gear rotates, to operate the valve. A drive gear 103 fast coaxially on the main shaft at the outer face of each of said outer crank disks 21 meshes with the two adjacent timing gears.

Said cams 100, 101 are so located relative to the crank shaft and piston positions as to operate the respective inlet and exhaust valves at the proper time in the selected sequence. Fig. 3 shows the cams for operating the inlet valves, the arrows indicating the direction of rotation of the gears, the sequence shown being adapted to provide for firing the first cylinder (associated with rocker arm 90a) 180 crank-shaft degrees before the third, 270 degrees before the fourth, and 450 degrees before the second, thus allowing a gang of the engines to be used on a single shaft and evenly distribute the firing throughout the shaft rotation. Thus the arrangement shown makes it possible to set up 2, 3, 4 or more motors one behind the other to make an engine of 8, 12, 16 or more cylinders.

Fig. 4 shows the cams for operating the exhaust for the sequence of Fig. 3, the arrows showing the direction of rotation of the gears.

The engine is a four-cycle engine; and the cylinder at the upper right of Fig. 3, associated with the rocker arm 90a is considered the first cylinder, the cylinder at the upper left to be the second cylinder, the cylinder at the lower left to be the third cylinder and the cylinder at the lower right to be the fourth cylinder. Starting with the firing position of the first cylinder as zero crank-degrees, the cycle of operation is substantially as tabulated as follows:

before the fourth, and 450 degrees before the second.

The outer face of each cylinder is of reduced diameter throughout the major portion between the inner end and the guide slot to provide jacket space 105 (Fig. 7) for water or other cooling medium; and the edge face of the engine block adjacent to each cylinder is deeply cut away to provide jacket space 106, the block being provided with internal bores 107, 108, 109, 110 (Fig. 5) connecting said jacket spaces in series and with the block jacket spaces and to a suitable exterior supply of water or other cooling medium. Cover plates 110, 111 are secured over said last named space 106 and over the outer ends of the cylinder-receiving bores.

The block 10 may be of aluminum or other desired suitable material and the other parts may be of such metal or material as the function thereof requires.

The operation of the motor will be readily understood from the foregoing. With the parts in the position of Figs. 3 to 5 and rotating in the direction of the arrows, the cylinder associated with the lever 90a being about halfway in its working stroke, the next piston is about to commence its intake stroke.

Figure 6:
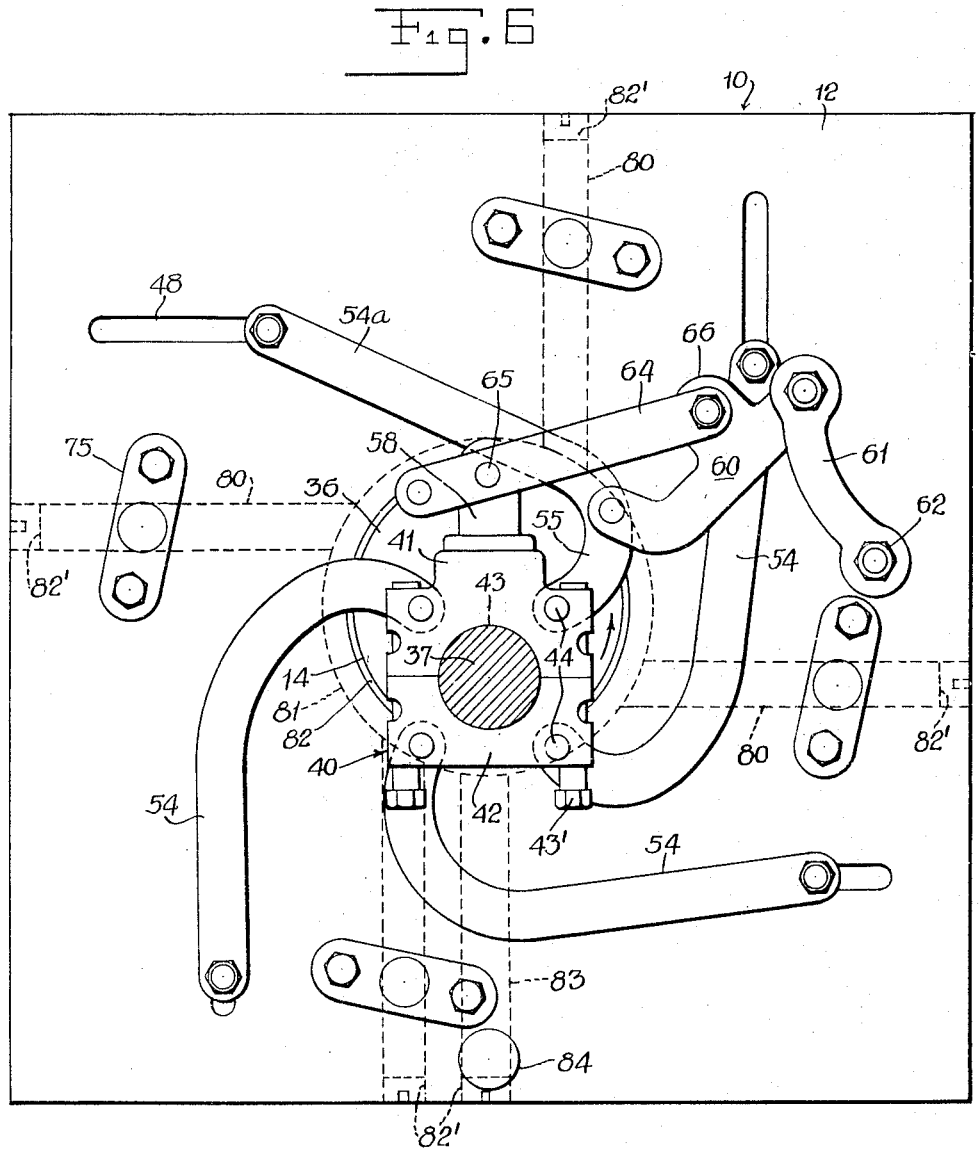
Fig. 6 is a similar view showing another position of the cross-head controlling mechanism.

Fig. 6 shows another position of the pistons and the piston connecting rods, showing the master connecting rod or cross-head 40 in the same angular direction as in Fig. 5, which direction the cross-head substantially retains in all positions of the pistons thereby maintaining substantially the same successive cycles of action and pressure on the cross-head and crank pin for all of the cylinders.

As the cam wheels 98 all rotate with exactly half the speed of the crank shaft, the cams 100 and 101 actuate the inlet and exhaust valves in the desired sequences.

As the angle of the control lever 58 relative to the engine block is substantially constant, each connecting rod bearing pin 44 describes a circle substantially equal to the throw of the crank pin 37. If the axis of each cylinder were alined with the center of its associated bearing pin circle, the length of piston stroke would be equal to the diameter of the associated bearing pin circle or the throw of the crank shaft. However, as shown, each connecting rod bearing pin 44 is much inwardly offset toward the crank pin from the extended axis of the associated cylinder, thereby causing the stroke of piston to be considerably greater than the throw of the crank pin. It is the fact that the piston pull on the crank pin rather than push on it that makes this arrangement practicable.

If it is desired that the piston travel should be different while the crank pin throw is the same, the master connecting rod may be redesigned to

| Crank-Shaft Degrees | Cylinder No. 1 | Cylinder No. 2 | Cylinder No. 3 | Cylinder No. 4 |
| --- | --- | --- | --- | --- |
| 0 | fire | exhaust | end of intake | intake. |
| 90 | work | start of intake | compression | end of intake. |
| 180 | end of work | intake | fire | compression. |
| 270 | exhaust | end of intake | work | fire. |
| 360 | start of intake | compression | end of work | work. |
| 450 | intake | fire | exhaust | end of work. |
| 540 | end of intake | work | start of intake | exhaust. |
| 630 | compression | end of work | intake | start of intake. |
| 720 | fire | exhaust | end of intake | intake. |

From this it is seen that the first cylinder fires 180 degrees before the third cylinder, 270 degrees place all pins 44 further or nearer from the center of the crank pin.

This arrangement gives more power than would be delivered by the same throw of crank shaft of a conventional motor of the same piston diameter. This extra piston travel above a given crank craft stroke is made practicable by the piston pulling the crank shaft instead of pushing it as in the conventional internal combustion motor.

Figure 12:
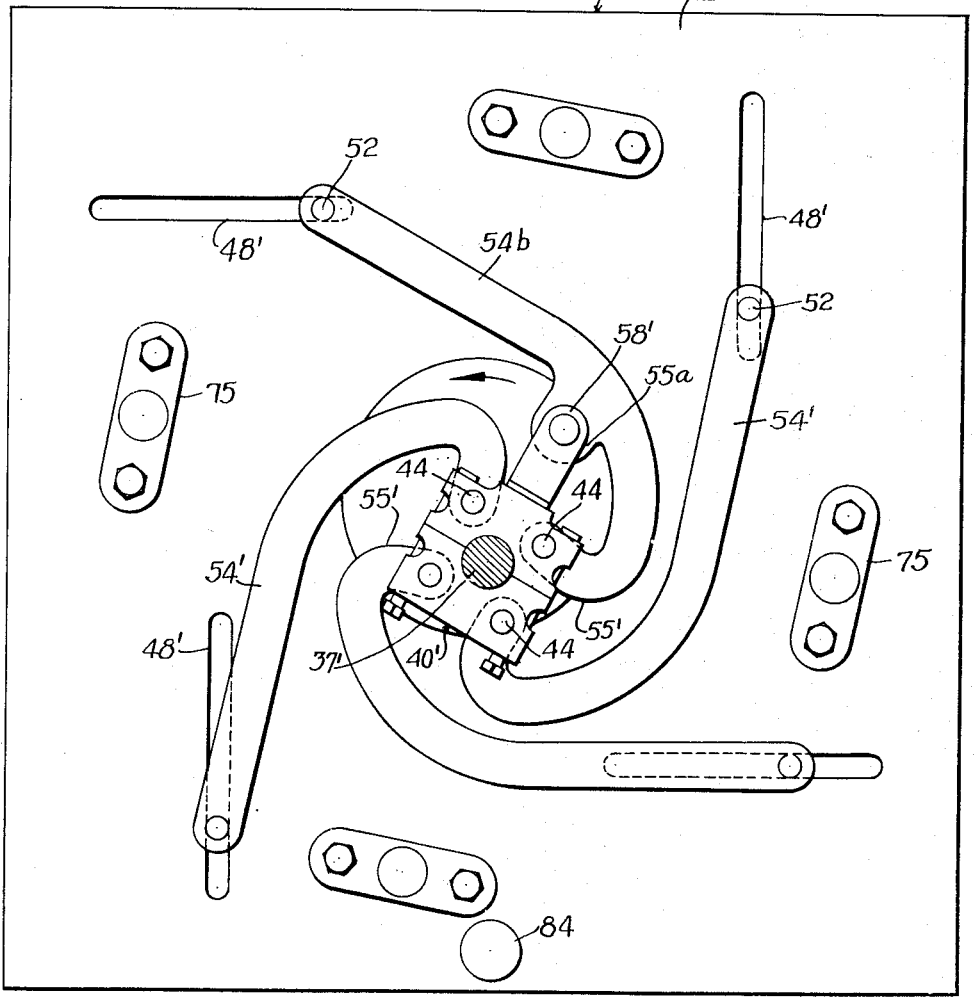
Fig. 12 is a figure similar to Fig. 6, but showing another form of cross-head controlling means.
Figure 8:
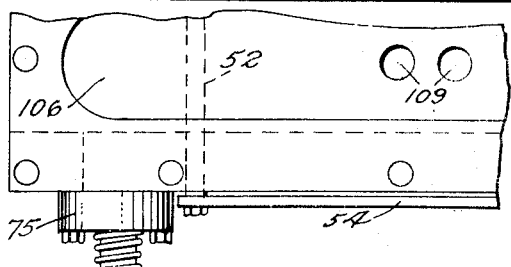
Fig. 8 is a fragmental plan showing a portion of the engine block and associated parts.

In the form of the invention of Fig. 12, the engine block 10 and the parts and features therein are similar to those of Figs. 1 to 11a; but the cross-head 40' on the crank pin 37' while similar to that of the other figures is somewhat rotated relative to said block 10 in a direction reverse to the direction of rotation of the crank shaft and each piston connecting rod 54b, 54' connected to each piston pin end 52, slidable in the slot 48', passes partly around and spaced from the cross-head peripheral part and bearing pin 44 nearest such piston pin and is inwardly turned as at 55' and connected to the connecting rod bearing pin 44 next behind such nearest bearing pin 44.

A holding lever 58' fast on the cross-head 40' and extending outwardly radially of the crank pin midway between two of said bearing pins 44 has its outer end disposed adjacent to the adjacent connecting rod, 54b formed with a lug secured fast to said holding lever for holding the angular direction of the cross-head 40' substantially constant with said adjacent connecting rod 54b. Otherwise the operation of the links 54a, 54' and cross-head 40 is the same as the operation of the links 54 and cross-head 40.

Either motor of Figs. 1 to 11 or 12 may be run on either side. The motor may be mounted with any one of the sides 11 or wall 17 uppermost or at an angle.

The invention claimed is:

1. In combination, a rotatably mounted crank shaft transverse to a plane and having crank pin portions at opposite sides of the plane; cylinders disposed around said shaft; cross-heads mounted on the crank pin portions; a piston in each cylinder having a piston pin having projecting ends; a piston link connected to each piston pin end and to the associated cross-head; and means for holding the angular direction of the cross-head substantially constant.

2. In combination, a rotatably mounted crank shaft having crank pin portions; cylinders disposed around said shaft; cross-heads mounted on the crank pin portions; a piston in each cylinder having a piston pin having projecting ends; a piston link connected to each piston pin end and to an associated cross-head.

3. A combination as in claim 2 comprising means for holding the angular direction of the cross-head substantially constant.

4. A combination as in claim 2, inlet and exhaust means at an end of the cylinder nearest to said shaft.

5. In combination, an engine having cylinders therein having their axis substantially forming a polygon with the firing ends of the cylinders pointing inwardly; a rotatably mounted crank shaft having crank pins at opposite sides of the plane of the polygon; a cross-head mounted on each crank pin, and carrying link-receiving pins defining a polygon with sides respectively substantially parallel to said first named polygon; a piston in each cylinder having a piston pin projecting on opposite sides of said plane; a piston link connected to each piston pin end and connected to the link-receiving pin adjacent to the associated cylinder and most remote from the associated piston pin; and means for holding the angular direction of the cross-head substantially constant.

6. In a combination as in claim 5 said cross-head being substantially rectangular and comprising upper and lower elongated members provided with semi-cylindrical bearing faces receiving the crank pins, and vertical end bolts connecting the members; said link receiving pins being mounted in the corners of said cross-head parallel to the crank shaft and disposed equal distances from the crank pin and spaced equal angles therearound.

7. In combination, an engine frame having cylinders therein each cylinder having a closed end and an open end, the cylinders having their axis substantially forming a polygon, with the open cylinder ends adjacent to the corners of the polygon respectively; a rotatably mounted crank shaft having crank pins at opposite sides of the plane of the polygon; a cross-head mounted on each crank pin having link-receiving pins therein; a piston in each cylinder having piston pin ends projecting on opposite sides of said plane; a piston rod or link pivotally received on each projecting end of each piston pin, and having an elongated part extending toward the inner end of the cylinder substantially longitudinal to the cylinder and substantially tangential to a circle spaced around the crank pin, the link having a hook turned toward the head and pivoted at its end to the adjacent link-receiving pin most remote from the associated piston pin; the midpart of the upper part of the cross-head having a substantially upright holding lever disposed near the longitudinal part of the adjacent link; and link means interposed between the frame, one of the piston links and said holding lever for substantially holding the head against absolute oscillation as the crank pin revolves with the edges of the cross-head substantially parallel with respective adjacent cylinders.

8. In combination, a rotatably mounted crank shaft transverse to a plane and having crank pin portions at opposite sides of the plane; outwardly open cylinders disposed around said shaft with their axes forming the four sides of a square plane; each cylinder having a closed end and an open end, the open end being adjacent to the corners of the square respectively a cross-head mounted on the crank pin portion having an upwardly extending holding lever fast thereon; a piston in each cylinder having a projecting piston pin; a piston link having an elongated part adjacent to the cylinder and connected to each piston pin end and a hooked part turned toward and connected to the cross-head; a connecting link pivoted near the inner juncture of the hooked part and the elongated part of the piston link nearest the holding lever and extending away from said part in a direction substantially away from the associated piston pin near the opposite edge of the square; a guide lever pivoted to one end of said link and having its other end fulcrumed on a fulcrum substantially near the inner end of the adjacent cylinder; and a control link pivotally connected at one end to the free end of the holding lever and at the other to said connecting link near the free end of the guide lever at a point somewhat offset in a direction away from said fulcrum from a line connecting the end pivotal connecting points of said control link.

9. In combination, a rotatably mounted crank shaft transverse to a plane and having crank pin portions at opposite sides of the plane; cylinders disposed around said shaft, their axis forming a square; cross-heads mounted on the crank pin portions; a piston in each cylinder having a piston pin having projecting ends; a piston link having a substantially longitudinal part connected to each piston pin end and a hook end connected to the cross-head; the cross-head having fast thereon midway between its pins a holding lever extending near the longitudinal part of an adjacent link; a connecting link pivoted to said adjacent link near the hook and extending in a direction away from the associated piston pin a distance equal to said longitudinal part; a guide lever pivoted to the other end of said link and having a lower end fulcrumed near the mid-part of the adjacent side of said square; a control link connecting the holding lever to said connecting link near the free end of the guide lever; the lengths and positions of said links and levers being such that the angular direction of the cross-head is maintained substantially constant.

10. In combination, an engine frame having cylinders therein having their axis substantially disposed in a plane; a rotatably mounted crank shaft having crank pins at opposite sides of said plane; a piston in each cylinder having a piston pin projecting on opposite sides of said plane and connected to the crank pin; inlet and exhaust valves on respective opposite sides of said plane communicating with each cylinder; and timing means on the respective sides operatively connected with the shaft for operating the valves.

11. In combination, an engine frame having cylinders therein having their axis substantially forming a square; a rotatably mounted crank shaft having crank pins at opposite sides of the plane of the square; a piston in each cylinder having a piston pin projecting on opposite sides of said plane and connected to the crank pin; inlet and exhaust valves on opposite sides of said plane communicating with each cylinder; and timing gears on each of said sides operatively connected with the shaft and each provided with cam lugs; and means engageable with said lugs and valves for operating the valves.

12. A combination as in claim 11, said valves each having a housing having an outer end wall, said valves opening inwardly and each having a stem projecting through the outer end wall of the housing and provided with a collar fast thereon; a spring compressed between the collar and valve housing; supporting disks mounted on opposite sides of said plane; rocker arms, one for each cylinder intermediately fulcrumed at the outer face of each supporting disk and each having an active end adapted to press against a valve stem for opening the valve; an operating rod slidable through an opening in the disk at the motive end of each rocker arm and pressed inwardly by such motive end, and having a rounded inner end engaged by one of said lugs.

13. In combination, an engine having cylinders therein having their axis substantially forming a polygon, with the outer cylinder ends pointing outwardly; a rotatably mounted crank shaft having crank pins at opposite sides of the plane of the polygon; a cross-head mounted on each crank pin; a piston in each cylinder having a piston pin projecting on opposite sides of said plane connected to the cross-head; inlet and exhaust valves on opposite sides of said plane communicating with each cylinder and provided with actuating rods for actuating the valves; supporting disks mounted on opposite sides of said plane; a pair of timing gears, rotatably mounted on and spaced from diagonally opposite parts of the inner face of each supporting disk and each provided on its face next to the supporting disk with a pair of arcuate cam lugs different distances from and coaxial with the center of the gear, and each engageable with one only of said actuating rods as the gear rotates, to operate the valve; a drive gear fast coaxially on the crank shaft and meshing with the two adjacent timing gears, and having half the diameter of the timing gears; said cams being so located relative to the crank shaft and piston positions as to operate the respective inlet and exhaust valves at the proper time in the selected sequence.

14. In combination, a block having narrow edge faces and wide side faces and a central bore; a rotatably mounted crank shaft in said bore transverse to the block and having crank pin portions at opposite sides of the block; cylinders disposed in said block around said shaft; cross-heads mounted on the crank portions; a piston in each cylinder having a projecting piston pin; a piston rod connected to each piston pin end and connected to the cross-head; housings secured to said side faces respectively and each comprising inner walls secured to the edge of said block, and a side wall secured to the inner wall parallel to and spaced from the adjacent side faces of the block; each of said side walls being provided with a large central boss alined with the central bore of the block; a supporting plate mounted on each inner wall and spaced from the side wall and block; and a tubular bearing fast on each disk and received in the adjacent central opening of the side wall and receiving the shaft.

15. In combination, a rectangular metallic engine block having narrow edge faces and wide substantially square side faces, and provided with a large central bore passing through the side faces; cylinder-receiving bores passing perpendicularly through said edge faces near corresponding ends thereof and each extending at its inner end to near the corresponding cylinder receiving bore of an adjacent edge face; a rotatably mounted crank shaft transverse to said block and having crank pin portions at opposite sides of the block in said bores respectively; cross-heads mounted on the crank portions; a piston in each cylinder having a piston pin having projecting ends; and a piston link connecting each pin end and the cross-head.

16. A combination as in claim 15 the engine block having a valve bore passing substantially perpendicularly through the valve block tangential to the outer peripheral part of the inner end of the interior of each cylinder, and having near each end an outwardly facing shoulder and provided between said shoulders with an elongated port longitudinal to the bore communicating with the end of the cylinder; a tubular valve housing in each end of said bore against said shoulder and having an outer end wall, a valve seat around the inner end and an intermediate lateral port; said engine valve block being bored to provide exhaust and inlet ducts leading to said lateral openings respectively; valves on said valve seats; and means for operating the valves.

17. A combination as in claim 15, said crank shaft including pairs of spaced outer and inner eccentric crank disks constituting cranks, and between the cranks of each pair, and a portion in the plane of the block between the inner cranks and providing a counterbalance for counterbalancing the crank pins; each inner crank disk snugly closing said large opening of the block.

18. In a combination as in claim 15, the cylinder fitted in each of said bores having the head at the inner end of the bore, and being open at the outer end; the cylinder and the block being provided near the open end with registering longitudinal piston-pin guide-slots in a plane of the cylinder axis perpendicular to the main plane of the block; the piston having an outwardly extending skirt carrying said piston pins, which are guided in, and project at both ends from the slots.

19. In a combination as in claim 15, said cylinders and block being provided with guide slots through which pin ends project; the outer face of each cylinder being of reduced diameter throughout the major position between the inner end and the guide slot to provide jacket space for cooling; the edge face of the engine block adjacent to each cylinder being deeply cut away to provide jacket space; cover plates secured over said last named space and the outer ends of the cylinder-receiving bores; the block being provided with internal bores connecting said cylinder jacket spaces in series and with the block jacket spaces.

20. In combination, an engine having cylinders therein having their axis substantially forming a polygon the cylinders having firing ends disposed intermediately of the sides of the polygon and pointing inwardly; a rotatably mounted crank shaft having crank pins at opposite sides of the plane of the polygon; a cross-head mounted on each crank pin, and carrying link receiving connecting rod bearing pins defining a polygon similar to said first named polygon; a piston in each cylinder having a piston pin having projecting ends on opposite sides of said plane; a piston connecting rod connected to each piston pin projecting end and a connecting rod bearing pin; and a holding lever fast on the cross-head and extending outwardly from the crank pin its outer end secured to an adjacent connecting rod.

21. In combination, an engine having cylinders therein having their axis substantially forming a polygon the cylinders having firing ends disposed intermediately of the sides of the polygon and pointing inwardly; a rotatably mounted crank shaft having crank pins at opposite sides of the plane of the polygon; a cross-head mounted on each crank pin, and carrying link receiving connecting rod bearing pins defining a polygon somewhat rotated relative to said first named polygon in a direction reverse to the direction of rotation of the crank shaft; a piston in each cylinder having a piston pin having projecting ends on opposite sides of said plane; a piston connecting rod connected to each piston pin projecting end and passing partly around and spaced from the cross-head peripheral part and bearing pin nearest such piston pin and connected to the connecting rod bearing pin next behind such nearest bearing pin; a holding lever fast on the cross-head and extending outwardly radially of the crank pin midway between two of said bearing pins and having its outer end disposed adjacent to the adjacent connecting rod; and a lug on said adjacent connecting rod secured fast to said holding lever for holding the angular direction of the cross-head substantially constant with said adjacent connecting rod.

22. In combination, a rotatably mounted crank shaft having crank pin portions; a cylinder having a closed rear inner end; a piston in the cylinder; connecting rod means pivotally connected to the piston on a pivot axis substantially intersecting the axis of the piston parallel to the crank shaft; and comprising connecting rods extending rearwardly from said pivot axis and pivotally connected to said portions; the line of the axis of said crank pin portions and the inner ends of the connecting rods being offset from the plane of the axis of the cylinder and said pivot axis; whereby the piston pulls on the crank shaft and travels further than the crank shaft throw.

23. In combination, a rotatably mounted crank shaft having crank pin portions; cylinders disposed around said shaft; each cylinder having its axis disposed substantially tangential to an approximate circle substantially coaxial with the crank shaft, each cylinder having an inner end substantially adjacent to the point of tangency of axis and an outer end disposed exteriorly of said circle substantially in the direction of rotation; master connecting rods mounted on the crank pin portions and each having connecting rod bearing pins; a piston in each cylinder; piston connecting rods connecting the pistons to the associated connected rod bearing pins; and means for holding the angular direction of the master connecting rod substantially constant; the crank shaft, pin portions and bearing pins being within a projection of said circle coaxial with its axis and offset from planes parallel to the crank shaft and determined by the axes of the cylinders, each pin being adjacent the inner end of the associated cylinder, each piston rod extending from its associated bearing pin approximately in the direction of rotation of the crank shaft; whereby the piston pulls on the crank shaft and travels further than the crank shaft throw, thereby increasing the pulling movement of the piston on the crank shaft; the piston travel being a function of the distance of offset of the crank pin piston from said line and the distance of the bearing pin from the center of the crank shaft toward said line.

LAURENCE C. MAHER.

REFERENCES CITED

The following references are of record in the file of this patent:

UNITED STATES PATENTS

| Number | Name | Date |
| --- | --- | --- |
| 245,022 | Sickels | Aug. 2, 1881 |
| 835,337 | Walker | Nov. 6, 1906 |
| 1,027,775 | Schubert | May 28, 1912 |
| 1,098,012 | Brown | May 26, 1914 |
| 1,272,975 | McGann | July 16, 1918 |
| 1,285,835 | Sunderman | Nov. 26, 1918 |
| 1,341,332 | McDonald | May 25, 1920 |
| 1,442,706 | Smith | Jan. 16, 1923 |
| 1,543,803 | Stary | June 30, 1925 |
| 1,639,333 | Ford | Aug. 16, 1927 |